United States Patent
Araki et al.

(10) Patent No.: US 8,478,109 B2
(45) Date of Patent: Jul. 2, 2013

(54) RECORDING APPARATUS AND METHOD, PROGRAM, AND STORAGE MEDIUM

(75) Inventors: Takahiro Araki, Kanagawa (JP); Hideki Ando, Kanagawa (JP); Hisao Tanaka, Tokyo (JP); Takashi Furukawa, Tokyo (JP)

(73) Assignee: Sony Corporation (JP)

( * ) Notice: Subject to any disclaimer, the term of this patent is extended or adjusted under 35 U.S.C. 154(b) by 1206 days.

(21) Appl. No.: 11/805,422

(22) Filed: May 23, 2007

(65) Prior Publication Data

US 2007/0286050 A1    Dec. 13, 2007

(30) Foreign Application Priority Data

May 30, 2006    (JP) ................ P2006-149929

(51) Int. Cl.
*H04N 5/94*    (2006.01)
(52) U.S. Cl.
USPC ............................ 386/263; 386/277; 386/239
(58) Field of Classification Search
None
See application file for complete search history.

(56) References Cited

U.S. PATENT DOCUMENTS

| | | | | |
|---|---|---|---|---|
| 7,813,248 B2 * | 10/2010 | Tsubaki et al. | ............ | 369/59.25 |
| 2005/0013583 A1 * | 1/2005 | Itoh | .................... | 386/1 |
| 2005/0013593 A1 * | 1/2005 | Jung et al. | ....................... | 386/98 |
| 2005/0025460 A1 * | 2/2005 | Hyodo et al. | .................. | 386/95 |
| 2005/0270825 A1 | 12/2005 | Tanaka et al. | | |
| 2006/0051056 A1 | 3/2006 | Furukawa et al. | | |
| 2006/0112124 A1 * | 5/2006 | Ando et al. | .................... | 707/101 |
| 2006/0126948 A1 * | 6/2006 | Fukuhara et al. | ............ | 382/232 |
| 2006/0143235 A1 * | 6/2006 | Takaku | ....................... | 707/104.1 |

FOREIGN PATENT DOCUMENTS

| | | |
|---|---|---|
| EP | 1 524 665 A1 | 4/2005 |
| JP | 2001-014827 A | 1/2001 |
| JP | 2001-045420 A | 2/2001 |
| JP | 2005-004853 A | 1/2005 |
| JP | 2005-301641 A | 10/2005 |
| JP | 2006-065912 A | 3/2006 |
| JP | 2007-226892 A | 6/2007 |
| WO | 00/49503 A1 | 8/2000 |
| WO | 2004/112023 A1 | 12/2004 |

* cited by examiner

*Primary Examiner* — William C Vaughn, Jr.
*Assistant Examiner* — Eileen Adams
(74) *Attorney, Agent, or Firm* — Lerner, David, Littenberg, Krumholz & Mentlik, LLP

(57) ABSTRACT

Disclosed herein is a recording apparatus for recording a file stream which may be composed of a header, a body, and a footer onto a storage medium. The apparatus may includes header area securing means for, before recording of the body, securing in a recording area of the storage medium a header area in which the header is to be recorded; recording means for recording the body and the footer in the recording area of the storage medium, re-securing the header area secured by the header area securing means based on areas in which the body and the footer have been recorded, and recording the header in the re-secured header area; and reflecting means for allowing information concerning the header area secured when a recording process performed by the recording means is terminated normally or abnormally to be reflected in a file system of the storage medium.

8 Claims, 11 Drawing Sheets

RECORDING APPARATUS AND METHOD, PROGRAM, AND STORAGE MEDIUM

CROSS-REFERENCE TO RELATED APPLICATIONS

This application claims priority from Japanese Patent Application No. JP 2006-149929, filed in the Japanese Patent Office on May 30, 2006, the entire content of which is incorporated herein by reference.

BACKGROUND OF THE INVENTION

1. Field of the Invention

The present invention relates to a recording apparatus and method, a program therefor, and a storage medium having the program stored therein. In particular, the present invention relates to a recording apparatus and method, a program therefor, and a storage medium having the program stored therein, which allow easy and proper storage of a file system even when a recording process is terminated abnormally.

2. Description of the Related Art

As a method for preventing occurrence of a seek when recording a file stream composed of a header portion, a body portion, and a footer portion onto a storage medium such as an optical disk, there is a known method of arranging (i.e., recording) the above portions in a recording area of the storage medium in the following order (i.e., in chronological order in which data of these portions appear): the body portion, the footer portion, and the header portion (see, for example, Japanese Patent Laid-open No. 2005-4853).

According to this recording method, a footer area in which the footer portion is recorded and a header area in which the header portion is recorded are located within the recording area of the storage medium so as to follow a body area in which the body portion is recorded. Therefore, a final location of the header area is not determined until the recording of the body portion is completed.

Specifically, during recording of a file, information concerning the recording area of the file is held in a memory within a recording apparatus, and at the time when the entire recording operation is completed, that information is reflected in a file system management area of the storage medium (on which the writing has been performed). For example, address information of the header area, the body area, and the footer area are held in the memory, and after the recording of the header, body, and footer portions is completed, the address information held in the memory is written to a file used for managing the file system recorded on the storage medium (i.e., information in the file system management area is updated).

Therefore, in the case where a power of the recording apparatus is erroneously turned off or a system hang-up erroneously occurs while the body portion is being written to the storage medium and thus the recording process is terminated abnormally, for example, the above-described recording method is not able to allow the file of which the recording has not been completed to be reflected in the file system in the storage medium in a format that is valid for the file system. That is, the file of which the recording has been terminated abnormally in the course of recording is regarded as "a file not recorded" in the file system.

When this occurs, salvaging means independent of a standard of the file system is required to recover the file (see, for example, Japanese Patent Laid-open No. 2006-65912). According to this method, predetermined information called a "salvage marker" is recorded at a predetermined interval when recording data on the storage medium, and when data recovery is performed after abnormal termination of the recording process, data that has not been reflected in the file system is searched for based on the markers as recorded, and information thereof is reflected in the file system.

Such a recovery method is effective particularly when the power of the recording apparatus has been erroneously turned off or the system hang-up has erroneously occurred to prevent the recording process from continuing (i.e., in the case where information concerning the recording cannot be reflected in the file system at the time of the abnormal termination).

SUMMARY OF THE INVENTION

In the case where similar recording is to be realized by application software, a file system driver (FSD), and the like that run on an operating system (OS) in a general-purpose personal computer or the like, the abnormal termination of recording is, in many cases, caused by abnormal termination of the application software. When the abnormal termination of the application software has occurred, it is difficult for the FSD to detect the abnormal termination of the application software; but, as the OS is still operating (i.e., the OS has not been terminated), the FSD is, in the case of an ordinary recording method, able to allow the information concerning the halfway recording to be reflected in the file system (i.e., file system management information) of the recording area of the storage medium to convert the data that has been recorded up to the abnormal termination into a format that complies with the standard of the file system of the recording area of the storage medium.

In other words, even if the abnormal termination occurs, it is possible to record the data so that the application software as re-activated (or similar application software that is executed on another personal computer) can resume the recording of the file easily without the need for the above-described data recovery.

As the header portion precedes the body portion in the file stream, declaration of an area for the header portion in the file system is required to achieve the above operation. In the above-described recording method as disclosed in Japanese Patent Laid-open No. 2005-4853, however, the final location of the header area is not determined until the recording of the body portion is completed, as described above; therefore, the declaration of the area for the header portion is not possible until the writing of the body portion is completed.

Accordingly, in the case where the abnormal termination of the application software has occurred because of a bug of the application software, resource shortage of the personal computer, or the like, there is a probability that the data that has been recorded up to the abnormal termination cannot be converted into the format that complies with the standard of the file system of the recording area of the storage medium. That is, when the recording of the file is terminated on the way because of the abnormal termination of the application software, there may be no other option than to perform the above-described data recovery by the special method as disclosed in Japanese Patent Laid-open No. 2006-65912, which is independent of the file system. This method may require an increased processing load and time to obtain proper data. In addition, because of the specialty of the above-described data recovery, there is a probability that the above-described data recovery cannot be performed depending on an environmental factor of the personal computer or the like.

An advantage of the present invention may be to achieve easy and proper storage of the file system even when the abnormal termination of the recording process has occurred.

According to one embodiment of the present invention, there is provided a recording apparatus for recording a file stream which may be composed of a header, a body, and a footer onto a storage medium, the apparatus which may include header area securing means for, before recording of the body, securing in a recording area of the storage medium a header area in which the header is to be recorded; recording means for recording the body and the footer in the recording area of the storage medium, re-securing the header area secured by the header area securing means based on areas in which the body and the footer have been recorded, and recording the header in the re-secured header area; and reflecting means for allowing information concerning the header area secured when a recording process performed by the recording means is terminated normally or abnormally to be reflected in a file system of the storage medium.

According to another embodiment of the present invention, there is provided a method for recording a file stream which may be composed of a header, a body, and a footer onto a storage medium, the method may include before recording of the body, securing in a recording area of the storage medium a header area in which the header is to be recorded; recording the body and the footer in the recording area of the storage medium, re-securing the header area secured by the securing step based on areas in which the body and the footer have been recorded, and recording the header in the re-secured header area; and allowing information concerning the header area secured when a recording process performed by the recording step is terminated normally or abnormally to be reflected in a file system of the storage medium.

According to one embodiment of the present invention, a header area to be provided within a recording area of a storage medium and in which a header is to be recorded may be virtually set before recording of a body, whereby the header area may be secured provisionally; a body and a footer may be recorded within the recording area of the storage medium; the secured header area may be re-secured by being re-set based on areas in which the body and the footer have been recorded; the header may be recorded in the re-secured header area; and information concerning the header area secured when a recording process is terminated normally or abnormally may be caused to be reflected in a file system of the storage medium.

According to embodiments of the present invention, recording of a file may be achieved. In particular, even if a recording process is terminated abnormally while the file is being recorded onto a storage medium such that pieces of data in the file are recorded in a predetermined order, proper storage of the file may be achieved easily so as to comply with a file system.

DETAILED DESCRIPTION

Hereinafter, embodiments of the present invention will be described with reference to the accompanying drawings.

Figure 1:
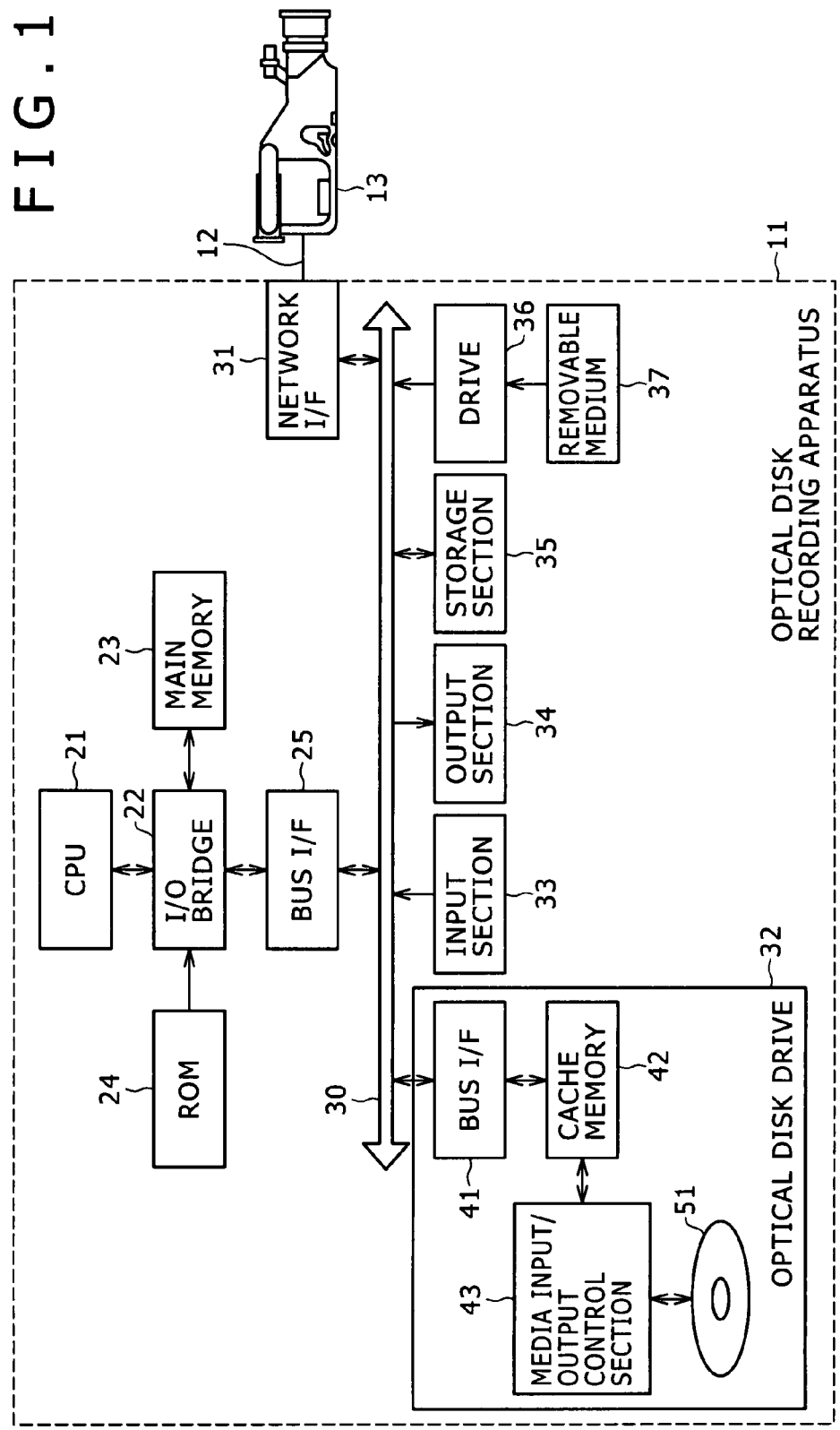
FIG. 1 is a block diagram illustrating an exemplary structure of an optical disk recording apparatus according to one embodiment of the present invention.

FIG. 1 is a block diagram illustrating an exemplary configuration of a system using an optical disk recording apparatus according to one embodiment of the present invention.

In FIG. 1, an optical disk recording apparatus 11 is an apparatus for recording data (e.g., image or audio data) on an optical disk (i.e., a storage medium), such as a compact disc (CD) or a digital versatile disc (DVD). The optical disk recording apparatus 11 records a file containing audiovisual (AV) data, such as image data or audio data, supplied from a video camera 13 connected thereto via a network cable 12 onto the optical disk in a predetermined file format.

The network cable 12 is a communication cable that complies with a predetermined standard, such as a USB (Universal Serial Bus) or IEEE (Institute of Electrical and Electronic Engineers) 1394 standard. The network cable 12 connects the video camera 13 to the optical disk recording apparatus 11 so as to allow communication therebetween (i.e., data exchange therebetween). In other words, the network cable 12 is a communication medium that achieves wired communication between the optical disk recording apparatus 11 and the video camera 13. Note that, instead of using the network cable 12, the optical disk recording apparatus 11 and the video camera 13 may be connected to each other via a wireless link, such as an infrared link, IEEE 802.11x, or the like, so as to allow communication therebetween.

The video camera 13 includes a camera section and a microphone section. The video camera 13 supplies the AV data, which is composed of the image data (e.g., a moving image or a still image) obtained by photographing via the camera section and the audio data obtained via the microphone section, and related data composed of information related to the AV data to the optical disk recording apparatus 11 via the network cable 12 in the form of a file according to a predetermined file system. Note that the video camera 13 may be a camcorder (registered trademark) that additionally has a function of recording an AV file on a storage medium. In this case, the video camera 13 is able to supply the file recorded on the storage medium to the optical disk recording apparatus 11 via the network cable 12. Also note that although the video camera 13 is used in FIG. 1, the video camera 13 may be replaced by any apparatus that is capable of supplying a file containing the AV data to the optical disk recording apparatus 11.

The optical disk recording apparatus 11 is, for example, formed by a general-purpose personal computer. In FIG. 1, the optical disk recording apparatus 11 includes a central processing unit (CPU) 21, an I/O (input/output) bridge 22, a main memory 23, a read-only memory (ROM) 24, and a bus interface (I/F) 25.

The CPU 21 is connected via the I/O bridge 22 to the main memory 23 formed by a semiconductor memory such as a dynamic random access memory (DRAM), the ROM 24, which is a nonvolatile memory, and the bus interface 25, which performs an interfacing process in relation to an internal bus 30. The CPU 21 executes various processes in accordance with a program stored in the ROM 24 or a program loaded from a storage section 35 described below to the main memory 23. The main memory 23 also stores, as necessary, data that is necessary when the CPU 21 executes the various processes.

The bus interface 25 is also connected to the internal bus 30. The internal bus 30 is, for example, a bus that complies with a predetermined standard, such as an Industry Standard Architecture (ISA) bus or a Peripheral Components Interconnect (PCI) bus. The internal bus 30 connects various parts described below and the bus interface 25 to one another, and serves as a communication medium for communication between those parts.

A network interface (I/F) 31, an optical disk drive 32, an input section 33, an output section 34, the storage section 35, and a drive 36 are also connected to the internal bus 30.

The network interface 31 performs a communication process by way of a network such as the Internet to exchange information with an apparatus external to the optical disk recording apparatus 11. The optical disk drive 32 writes or read data to or from an optical disk medium 51 mounted at a predetermined location thereof. For example, the optical disk drive 32 writes data supplied via the internal bus 30 to the optical disk medium 51, such as a compact disc-recordable (CD-R) or a digital versatile disc-recordable (DVD-R), mounted at the predetermined location. Further, for example, the optical disk drive 32 reads data recorded on the optical disk medium 51 and supplies the data read therefrom to the main memory 23 via the internal bus 30.

The optical disk drive 32 contains a bus interface (I/F) 41, a cache memory 42, and a media input/output control section 43. The bus interface 41 performs an interfacing process in relation to the internal bus 30. The cache memory 42 temporarily holds data supplied from the bus interface 41 or the media input/output control section 43 to reduce overflow due to a difference in speed between data input and data output. The media input/output control section 43 controls a pickup (not shown), and writes data acquired from the cache memory 42 to the optical disk medium 51 mounted at the predetermined location of the optical disk drive 32, or reads the data recorded on the optical disk medium 51 and supplies the read data to the cache memory 42.

The optical disk medium 51 is a storage medium supported by the optical disk drive 32. The optical disk medium 51 is formatted according to a predetermined file system, such as a universal disk format (UDF), for example. The process of recording information onto the optical disk medium 51 is performed in a method that complies with the format of this file system. This process is performed by software (an application program or a driver) that operates under control of the CPU 21. Therefore, the optical disk drive 32 only executes instructions supplied from the CPU 21, and does not analyze or operate the format of the file system of the optical disk medium 51.

Note that, although the optical disk medium 51 is used as an exemplary storage medium in the following description, any storage medium is applicable that is capable of having recorded thereon the file containing the AV data as described below. Examples of such storage media include magnetic storage media such as a magnetic tape and a hard disk, magneto-optical disks such as an MD (Mini-Disk (registered trademark)), and semiconductor memories such as a flash memory.

Returning to FIG. 1, the input section 33 connected to the internal bus 30 includes input devices such as a keyboard and a mouse, for example. The input section 33 accepts a user instruction via such an input device, and supplies the user instruction to the CPU 21 or the like via the internal bus 30. The output section 34 includes output devices such as a display formed by a cathode ray tube (CRT) or a liquid crystal display (LCD) and a loudspeaker, for example. The output section 34 outputs the AV data or the like supplied via the internal bus 30 as an image, sound, or the like. The storage section 35 includes a storage medium such as a hard disk. For example, the storage section 35 stores the program, the data, etc., executed by the CPU 21, and supplies such information via the internal bus 30 as necessary. A removable medium 37, such as a magnetic disk, an optical disk, a magneto-optical disk, or a semiconductor memory, is mounted as necessary at a predetermined location on the drive 36. A computer program is read from the removable medium 37 and installed into the storage section 35 as necessary.

The CPU 21 of the optical disk recording apparatus 11 having the above-described structure transmits instructions to the network interface 31 via the internal bus 30 to allow the network interface 31 to control the video camera 13 connected thereto via the network cable 12 and acquire a video/audio signal (i.e., the AV data) from the video camera 13 in a synchronized manner. The network interface 31 contains a buffer memory, and is capable of storing the acquired signal temporarily to reduce a difference in speed between communication via the internal bus 30 and communication via the network cable 12. The network interface 31 supplies the acquired AV data to the main memory 23 via the internal bus 30, so that the main memory 23 holds the AV data.

The CPU 21 performs a signal processing or a format conversion process on the AV data (file) held by the main memory 23 as necessary, and supplies the file to the optical disk drive 32 via the internal bus 30 so that the optical disk drive 32 writes the file to the optical disk medium 51.

Figure 2:
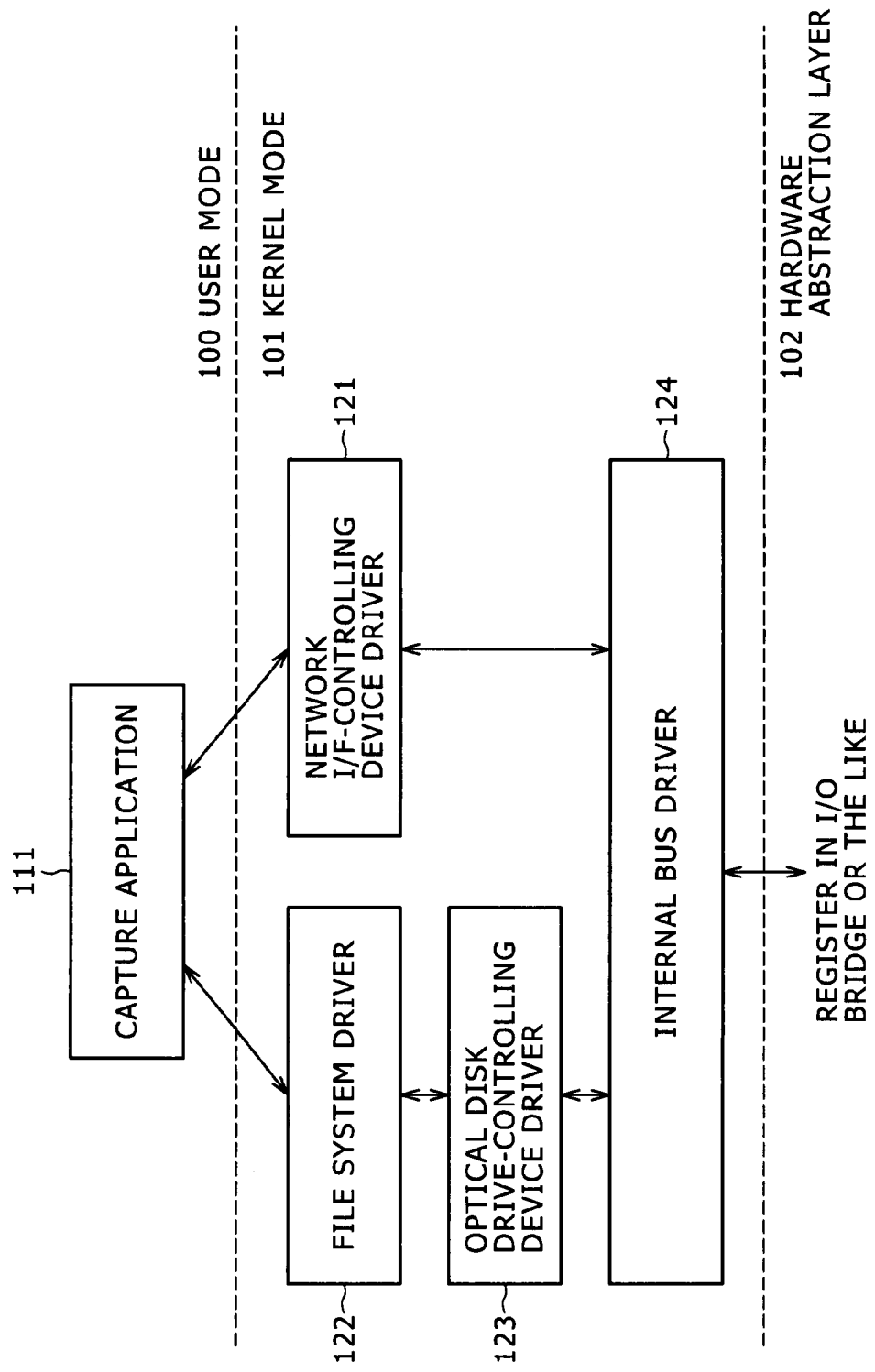
FIG. 2 is a schematic diagram illustrating an exemplary structure of software.

FIG. 2 is a schematic diagram illustrating an exemplary structure of the software executed by the CPU 21 in FIG. 1.

In FIG. 2, the structure of the software is divided into a user mode (i.e., the uppermost layer) 100, a kernel mode (i.e., a middle layer) 101, and a hardware abstraction layer (i.e., the lowermost layer) 102. First, a capture application 111 that operates in the user mode 100 issues to a "network interface-controlling device driver" (i.e., a network I/F-controlling device driver) 121, which operates in the kernel mode 101 and is used to control the network interface 31, an instruction to read the video/audio signal from the video camera 13 in FIG. 1, and allows the network interface 31 to transfer the video/audio signal held in the buffer memory in the network interface 31 to the main memory 23. Thereafter, the signal conversion process or the format conversion process necessary in the main memory 23 is performed. Here, the network interface-controlling device driver 121 uses an internal bus driver 124, which is used to control the bus interface 25, and an interface in the hardware abstraction layer 102 to access a register in the I/O bridge 22 or the like, and issues the instruction to read and transfer the video/audio signal to the network interface 31 via the internal bus 30.

Further, the capture application 111 issues, to a file system driver 122 that operates in the kernel mode 101, an instruction to write the files of the video and audio data subjected to format conversion in the main memory 23. This writing instruction is transferred from the file system driver 122 to the optical disk drive 32 via an "optical disk drive-controlling device driver" 123, which is used to control the optical disk drive 32, the internal bus driver 124, and the internal bus 30. Here, it is necessary to specify at which address on the optical disk medium 51 (i.e., at which address in the recording area of the optical disk medium 51) a data stream (i.e., the data of the files) is to be written. In the present system, the capture application 111 is able to set (i.e., specify), for the file system driver 122, the address at which the data stream is to be written.

Figure 3:
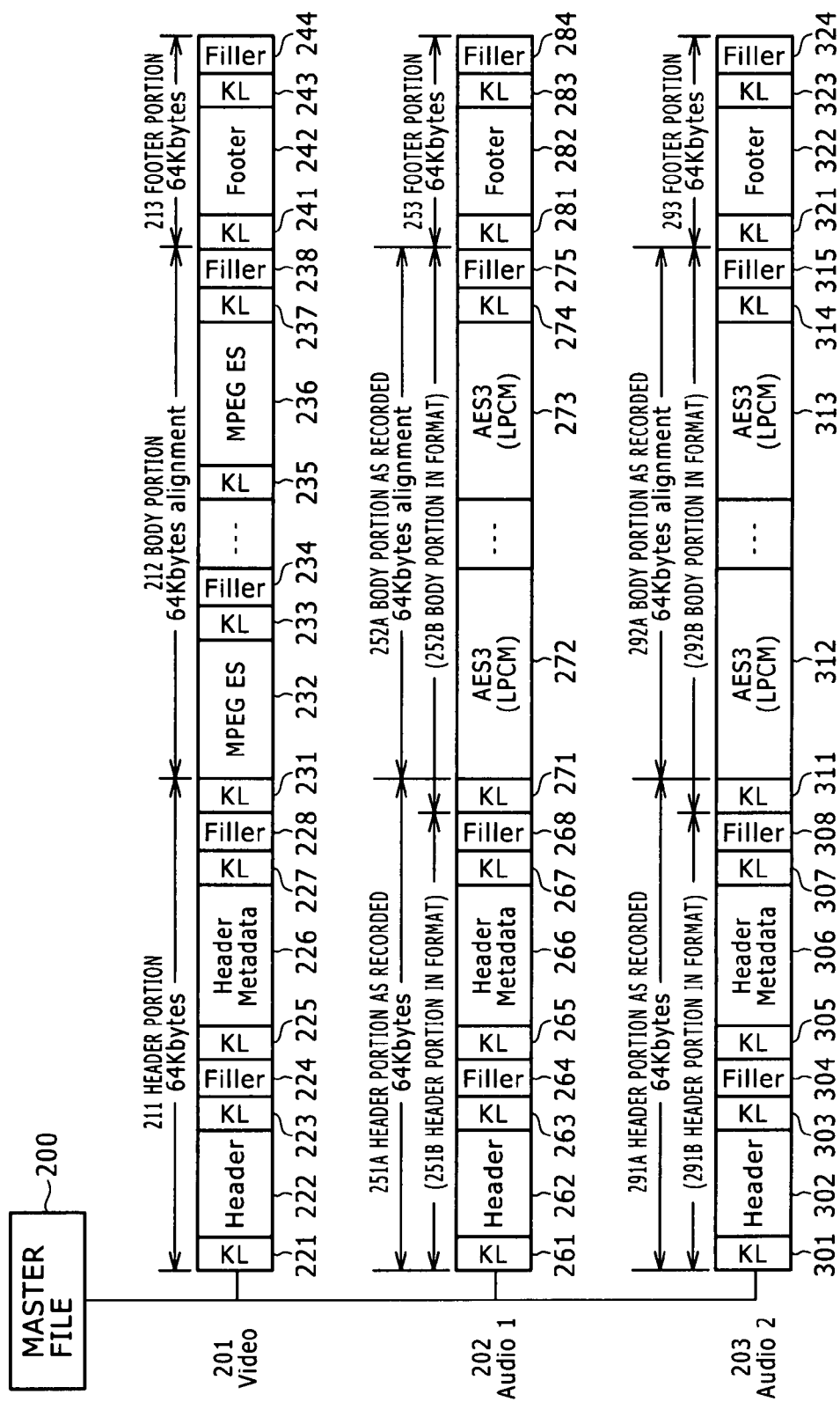
FIG. 3 is a diagram illustrating an exemplary file format.

FIG. 3 shows an exemplary file format used when the system of FIG. 1 writes the video/audio signal to the optical disk medium 51. As illustrated in FIG. 3, the video/audio signal to be recorded on the optical disk medium 51 is converted into a file in which the video data, the audio data, and the related data are gathered separately. In an example of FIG. 3, the video/audio signal is managed in the main memory 23 as three files, i.e., a video file (Video) 201, an audio file (Audio1) 202, an audio file (Audio2) 203, which are constructed under a master file 200, in which pointers to the subordinate files are described.

The video file 201 is a file that complies with a material exchange format (MXF), and is composed of a header portion 211, a body portion 212, and a footer portion 213. The header portion 211 is 64-kilobyte data, for example. The header portion 211 has a so-called KLV (Key, Length, Value) structure. That is, within the header portion 211, the data is arranged in the following order: Key, Length, and Value. A 16-byte label that complies with SMPTE 298M standard and indicates which type of data is arranged in Value is arranged in Key. A data length of the data arranged in Value is arranged in Length. Actual data is arranged in Value.

Specifically, in the example of FIG. 3, in the header portion 211 of the video file 201, KL data (KL) 221 is followed by a header (Header) 222 as Value of the KL data (KL) 221; and KL data (KL) 225 is followed by header metadata (Header Metadata) 226 as Value of the KL data (KL) 225. Note that as the header portion 211 has a fixed length, a filler (Filler), i.e., data used for stuffing, is arranged so as to have the KLV structure. That is, a filler (Filler) 224 is arranged so as to follow KL data (KL) 223, and a filler (Filler) 228 is arranged so as to follow KL data (KL) 227.

In the body portion 212, the video data (i.e., a part of the AV data) is constructed as a 64-kilobyte alignment of KLV structures, for example. Value of each KLV structure is composed of either an elementary stream of the video data as encoded according to an MPEG (Moving Picture Experts Group) system (i.e., MPEG ES (MPEG Elementary Stream)) or a filler. In the example of FIG. 3, KL data (KL) 231 is arranged at the top of the body portion 212, followed by an elementary stream (MPEG ES) 232 as Value of the KL data (KL) 231; and KL data (KL) 233 is arranged so as to follow the elementary stream (MPEG ES) 232, and is followed by a filler (Filler) 234 as Value of the KL data (KL) 233. They are followed by similar KLV structures, which is followed by KL data (KL) 235, followed by an elementary stream (MPEG ES) 236 as Value of the KL data (KL) 235. Then, KL data (KL) 237 is arranged so as to follow the elementary stream (MPEG ES) 236, and is followed by a filler (Filler) 238 as Value of the KL data (KL) 237.

Similar to the header portion 211, the footer portion 213 is constructed as 64-kilobyte data having the KLV structure, for example. Specifically, in the example of FIG. 3, KL data (KL) 241 is arranged at the top of the footer portion 213, followed by a footer (Footer) 242 as Value of the KL data (KL) 241; and KL data (KL) 243 is arranged so as to follow the footer (Footer) 242, and is followed by a filler (Filler) 244.

The audio file 202 is also a file that complies with the MXF, and has the basically same structure as that of the video file 201. The audio file 202 is composed of a header portion 251, a body portion 252, and a footer portion 253.

As illustrated in FIG. 3, the header portion 251 and the body portion 252 as recorded are different in structure from those in MXF format. In FIG. 3, the header portion 251 and the body portion 252 as recorded are denoted by reference numerals 251A and 252A, respectively, while those in MXF format are denoted by reference numerals 251B and 252B, respectively. Specifically, in the example of FIG. 3, the header portion 251B in MXF format is composed of KL data (KL) 261, a header (Header) 262, KL data (KL) 263, a filler (Filler) 264, KL data (KL) 265, header metadata (Header Metadata) 266, KL data (KL) 267, and a filler (Filler) 268, which are arranged in this order. In the body portion 252B in MXF format, the audio data (i.e., a part of the AV data) is constructed as an alignment of KLV structures. Value of each KLV structure is composed of either an elementary stream (AES3 (LPCM)) of the audio data as encoded according to an AES (Audio Engineering Society) 3 system (i.e., an LPCM (Linear Pulse Code Modulation) system) or a filler (Filler). Specifically, KL data (KL) 271 is arranged at the top of the body portion 252B, and is followed by an elementary stream (AES3 (LPCM)) 272 as Value of the KL data (KL) 271. They are followed by similar KLV structures. Then, KL data (KL) 274 and a filler (Filler) 275 are arranged so as to follow an elementary stream (AES3 (LPCM)) 272.

In contrast, the header portion 251A as recorded is composed of all the components of the header portion 251B and the KL data 271 contained in the body portion 252B. Naturally, in the body portion 252A as recorded, the components from the elementary stream 272 to the filler (Filler) 275 are arranged.

Similar to the footer portion 213 of the video file 201, the footer portion 253 is 64-kilobyte data having the KLV structure, for example. In the example of FIG. 3, the footer portion 253 is composed of KL data (KL) 281, a footer (Footer) 282, KL data (KL) 283, and a filler (Filler) 284, which are arranged in this order.

The audio file 203 is a file containing audio data of a channel different from that of the audio file 202, and has the same structure as that of the audio file 202. Therefore, the audio file 203 complies with the MXF, and is composed of a header portion 291, a body portion 292, and a footer portion 293.

A header portion 291B in MXF format is composed of KL data (KL) 301, a header (Header) 302, KL data (KL) 303, a filler (Filler) 304, KL data (KL) 305, header metadata (Header Metadata) 306, KL data (KL) 307, and a filler (Filler) 308, which are arranged in this order. A body portion 292B in MXF format is composed of KL data (KL) 311, an elementary stream (AES3 (LPCM)) 312, . . . , an elementary stream (AES3 (LPCM)) 313, KL data (KL) 314, and a filler (Filler) 315, which are arranged in this order.

In contrast, a header portion 291A as recorded is composed of all the components of the header portion 291B and the KL data 311 contained in the body portion 292B. Naturally, in a body portion 292A as recorded, the components from the elementary stream 312 to the filler (Filler) 315 are arranged.

Similar to the footer portion 253 of the audio file 202, the footer portion 293 is 64-kilobyte data having the KLV structure, for example. In the example of FIG. 3, the footer portion 293 is composed of KL data (KL) 321, a footer (Footer) 322, KL data (KL) 323, and a filler (Filler) 324, which are arranged in this order.

In FIG. 3, the video/audio signal is composed of a single video file and two audio files. However, the number of video files and that of audio files may be any number. Further, the video/audio signal may also include other types of files, such as a file composed of metadata, a file containing low-resolution data, or the like.

The capture application 111 in FIG. 2 (i.e., the CPU 21 in FIG. 1) acquires the video/audio signal from the video camera 13 and, while allowing the main memory 23 to hold the video/audio signal, converts the signal into the file format as illustrated in FIG. 3, and then, allows the optical disk drive 32 to write each file to the optical disk medium 51 sequentially.

At this time, the capture application 111 (i.e., CPU 21) allows the optical disk drive 32 to write the header portion of each file after writing the footer portion thereof. The header portion of each file needs to have described therein a total recording length of the file and the like. However, the total recording length and the like is a parameter that is not determined until the end of writing. Therefore, in the case where writing to the storage medium is performed in an ordinary order (i.e., the header, then the body, and then the footer), it is necessary to write the header portion again to modify the total recording length and the like, at least after writing a final part of the body portion. This involves a seek from one location to another distant location within the recording area of the optical disk medium 51, which may result in considerable reduction in writing performance.

As such, although the header is logically located at a forward position in the file format, the above-described method as disclosed in Japanese Patent Laid-open No. 2005-4853 secures, in arrangement, an area for the header at a location to the rear of an area for the footer, and, after recording the footer portion, records information of the header portion in an area contiguous to that of the footer portion, thereby preventing occurrence of the seek and reduction in writing performance.

When this method is adopted and the capture application 111 is abnormally terminated in the course of writing the file, for example, the file may not be recognized in the file system of the optical disk medium 51 (i.e., the file may be regarded as not having been recorded at all), as the writing of the header portion is not completed.

In the case where an unexpected trouble occurs in the kernel mode 101 or in any lower layer in the software structure of FIG. 2, or in the case where the video/audio signal inputted from the video camera 13 involves abnormality, for example, some special solution will be required. In the case where only the capture application 111 in the user mode 100 of FIG. 2 is abnormally terminated, however, the file system driver 122 is able to allow the file system to reflect information concerning the writing of the file up to the abnormal termination, thereby making the file recognizable in the file system.

As such, the capture application 111 provisionally secures, before writing the body portion, a header area in which the header portion is to be recorded. Thus, in the case where only the capture application 111 in the user mode 100 is abnormally terminated (incidentally, the capture application 111 is most likely to be terminated abnormally), a "writing process" can be terminated normally (i.e., the file can be closed) to make the data written up to the abnormal termination a recognizable file.

Figure 4:
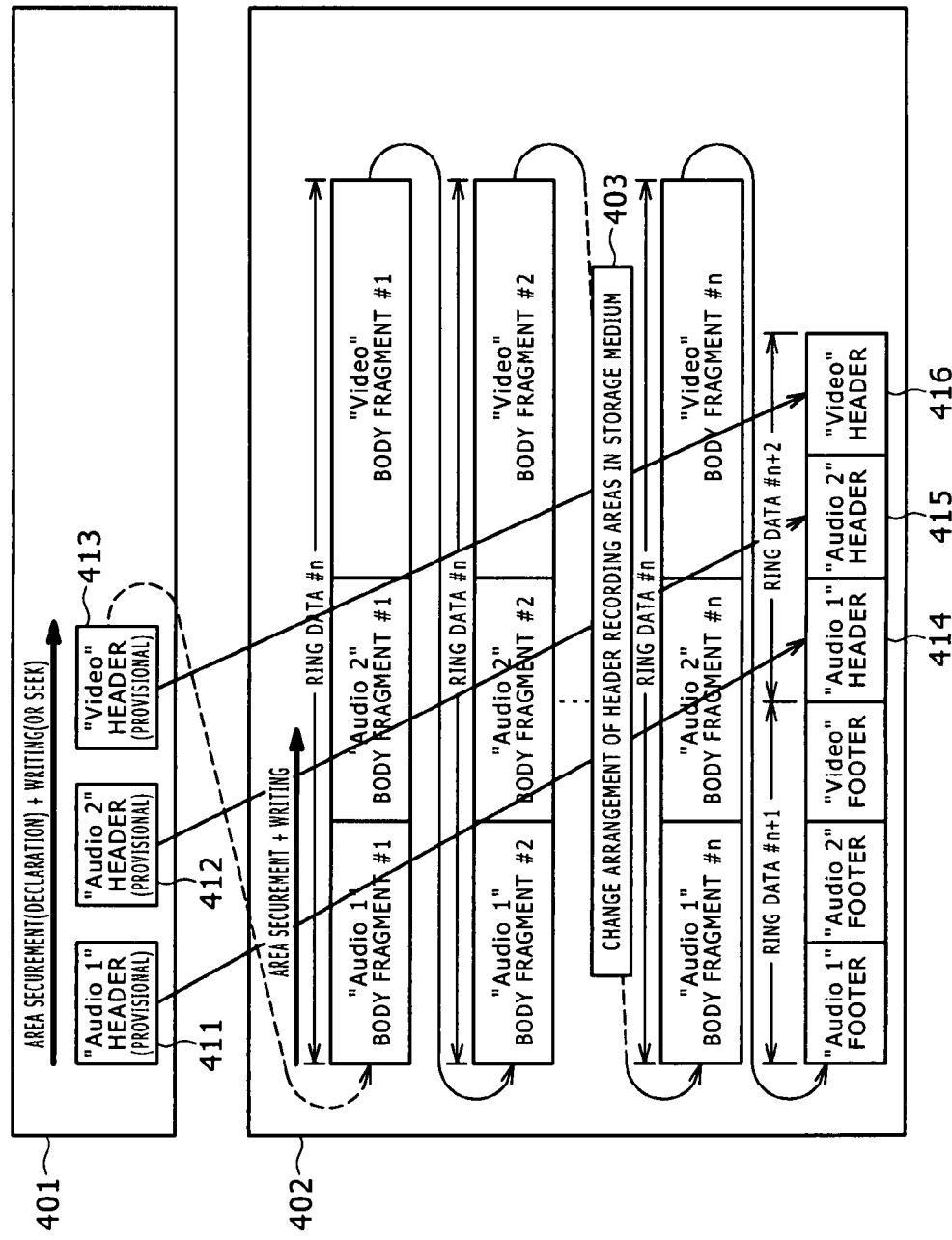
FIG. 4 is a schematic diagram illustrating an operation model of a writing process.

FIG. 4 is a schematic diagram illustrating an operation model of the writing process. In this writing process, first, the header area to which the header portion of each file is written is secured provisionally (process 401).

Next, body fragment areas to which the elementary streams of the body portions of the audio data (Audio1) 202, the audio data (Audio2) 203, and the video data (Video) 201 are written consecutively are secured sequentially, and the data is recorded therein sequentially. Then, at the time when the last body fragment area has been secured and data has been recorded therein, footer areas to which the footer portions are written are secured, and the footer portions of the audio data (Audio1) 202, the audio data (Audio2) 203, and the video data (Video) 201 are recorded therein. Thereafter, a header area to which the header portions are written is secured again based on the body areas and the footer areas, and the header portions of the audio data (Audio1) 202, the audio data (Audio2) 203, and the video data (Video) 201 are recorded therein (process 402).

As described above, while the header area is secured in process 401, the location thereof in the recording area of the optical disk medium 51 is updated in process 402. Specifically, referring to FIG. 4, a provisional header area ("Audio1" header (provisional)) 411 for the audio file 202 secured in process 401 is changed to a header area ("Audio1" header) 414 in process 402; a provisional header area ("Audio2" header (provisional)) 412 for the audio file 203 secured in process 401 is changed to a header area ("Audio2", header) 415 in process 402; and a provisional header area ("Video" header (provisional)) 413 for the video file 201 secured in process 401 is changed to a header area ("Video" header) 416 in process 402.

In the case where some trouble occurs during the writing process by the capture application 111 to terminate the process (i.e., in the case where only the capture application 111 in the user mode 100 has been abnormally terminated), the provisional securing of the header area before the recording of the body portions as described above enables the file system driver 122 that operates in the kernel mode 101 to allow information concerning areas that have been secured and locations where the data has been recorded until the abnormal termination to be reflected in the file system of the optical disk medium 51. Accordingly, the file of which the writing has not been completed can be recognized as a file on the file system.

Specific flows of processes will now be described below.

Figure 5:
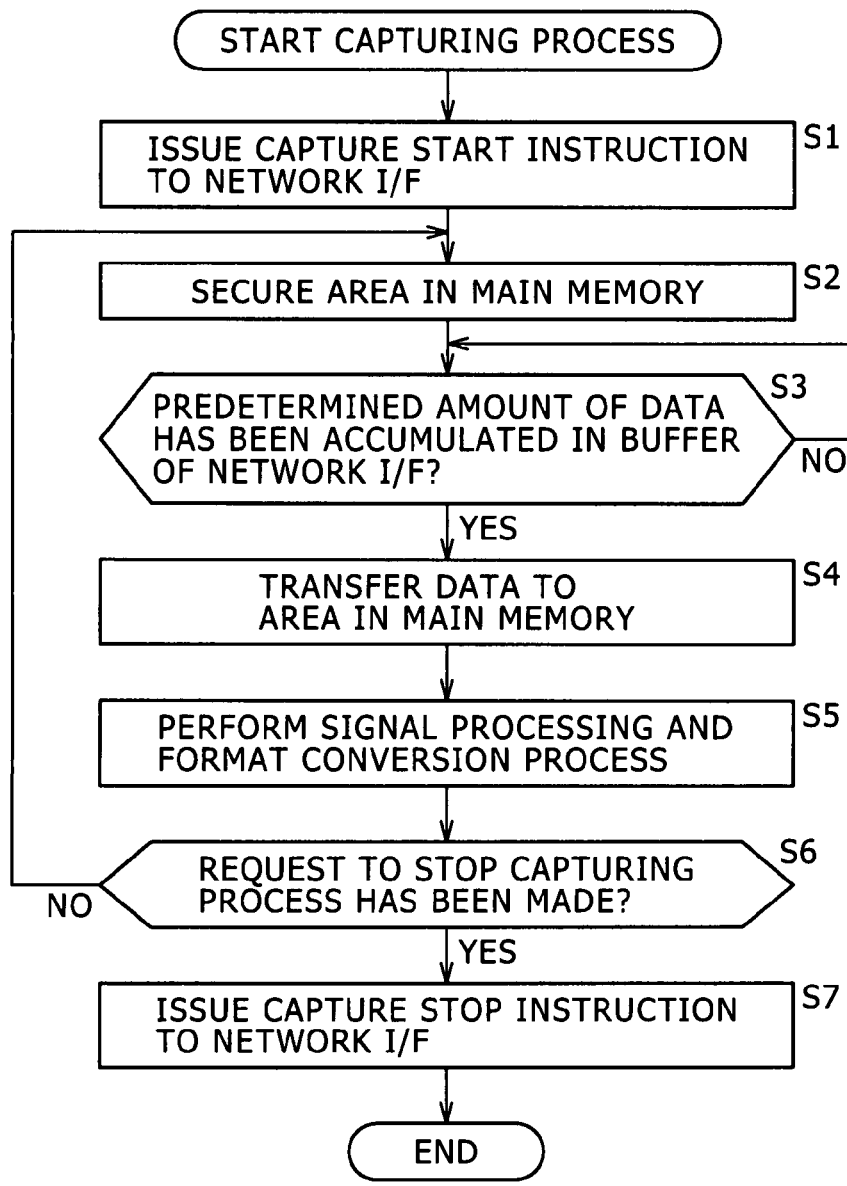
FIG. 5 is a flowchart for explaining an exemplary flow of a capturing process.

First, an exemplary flow of a capturing process will now be described below with reference to a flowchart of FIG. 5. In the capturing process, the CPU 21 that executes the capture application 111 (hereinafter referred to as the "capture application 111") acquires the video/audio signal (i.e., the AV data) from the video camera 13 and allows the main memory 23 to hold the video/audio signal.

In performing the capturing process, the capture application 111 uses the network interface-controlling device driver 121 to transfer the video/audio signal (i.e., the AV data) from the video camera 13 to the main memory 23 and performs the signal processing and the format conversion process on the video/audio signal.

For example, when a user uses the input section 33 to issue an instruction to capture (acquire) the video/audio signal, the capture application 111 starts the capturing process, and issues to the network interface-controlling device driver 121 an instruction to start capture at step S1. In accordance with this instruction, the network interface-controlling device driver 121 allows the network interface 31 to start the capture of the video/audio signal from the video camera 13. In accordance with this control, the network interface 31 acquires the video/audio signal from the video camera 13, and holds the video/audio signal in the internal buffer (not shown) temporarily.

At step S2, the capture application 111 secures, in a storage area of the main memory 23, an area of a predetermined data size for holding the video/audio signal. This predetermined data size corresponds to, for example, a fixed amount of data as measured in time (e.g., two seconds of data, 60 data frames, etc.).

At step S3, the capture application 111 checks the data amount of the video/audio signal accumulated in the internal buffer of the network interface 31, and determines whether the data amount of the video/audio signal accumulated therein corresponds to the size of the area secured in the main memory 23 at step S2. The capture application 111 waits until the determination at step S3 becomes affirmative.

When it is determined that the data amount of the video/audio signal accumulated in the internal buffer of the network interface 31 corresponds to the size of the area secured in the main memory 23, the capture application 111 proceeds to step S4. At step S4, the capture application 111 uses the network interface-controlling device driver 121 to issue to the network interface 31 an instruction to transfer the data of the video/audio signal to the main memory 23. In accordance with this instruction, the network interface 31 transfers the data of the video/audio signal accumulated in the internal buffer to the main memory 23 via the internal bus 30.

At step S5, the capture application 111 performs the signal processing and the format conversion process on the video/audio signal transferred to the main memory 23 to generate data that will be written to the optical disk medium 51 as the body fragments of the video file 201, the audio file 202, and the audio file 203 as illustrated in FIG. 3.

At step S6, the capture application 111 determines whether a request to stop the capturing process has been made, and if it is determined that such a request has not been made, the capture application 111 returns to step S2 and repeats the subsequent processes. Specifically, the above-described processes are performed on data newly acquired by the network interface 31 from the video camera 13 and accumulated in the internal buffer of the network interface 31. When, after the above-described processes of steps S2 to S6 are repeated, it is determined at step S6 that the request to stop the capturing process has been made by the user operating the input section 33, for example, the capture application 111 proceeds to step S7. At step S7, the capture application 111 uses the network interface-controlling device driver 121 to issue to the network interface 31 an instruction to stop the capture. When this capture stop instruction is issued, the network interface 31 stops the acquisition of the video/audio signal from the video camera 13. After issuance of the capture stop instruction, the capture application 111 finishes the capturing process.

As a result of the above-described capturing process, the file of the video/audio signal having the structure as described above with reference to FIG. 3 is generated in the main memory 23.

Independently of the above-described capturing process, the capture application 111 performs a recording process. In the recording process, the capture application 111 records each file of the video/audio signal accumulated in the main memory 23 by the capturing process onto the optical disk medium 51 mounted on the optical disk drive 32. The recording process can be performed in parallel with the capturing process.

Figure 6:
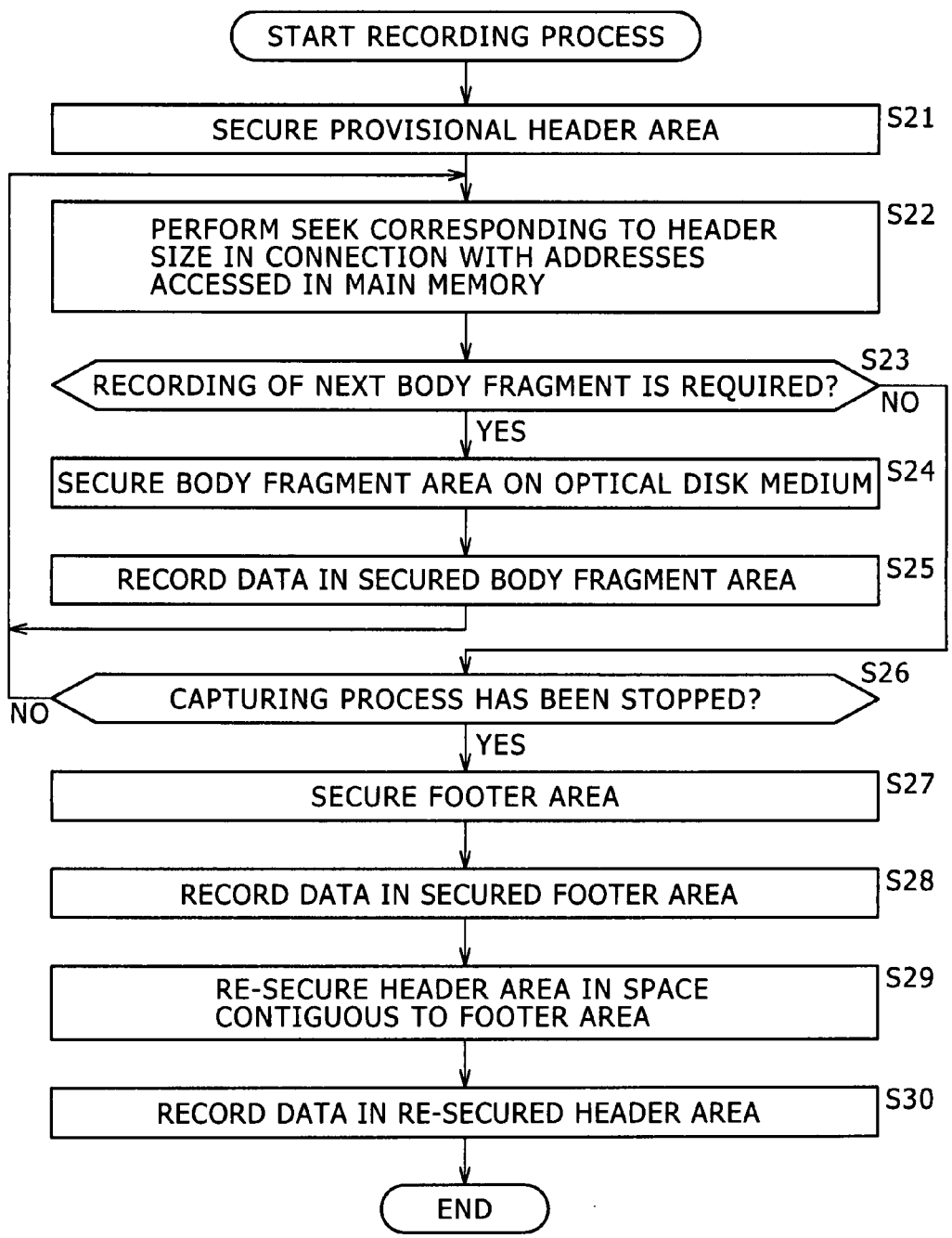
FIG. 6 is a flowchart for explaining an exemplary flow of a recording process.

An exemplary flow of the recording process will now be described below with reference to a flowchart of FIG. 6.

When the recording process is started based on a user instruction accepted via the input section 33, for example, the capture application 111 allows the file system driver 122 to secure the provisional header area at step S21. The location where the provisional header area is secured is arbitrary. The details thereof will be described later. This securing of the provisional header area is not reflected at this time in the file system in the optical disk medium 51 (i.e., address information of the header area is not recorded at this time in management information recorded on the optical disk medium 51).

Instead, the file system driver 122 executed by the CPU 21 virtually holds area information concerning the header area in the main memory 23.

Specifically, before the recording of the body portions, the capture application 111 allows the file system driver 122 to virtually set the header area at an arbitrary area (location) within the recording area of the optical disk medium 51 and hold the area information concerning the provisional header area in the main memory 23 to secure the header area provisionally (i.e., secure the provisional header area).

After securing the provisional header area, the capture application 111, at step S22, performs a seek corresponding to the header size in connection with addresses accessed in the main memory 23. That is, the capture application 111 performs a seek corresponding to the header portions so that the file system driver 122 can acquire from the main memory 23 the body portion of the file to be processed. Actual writing of the header portion to the optical disk medium 51 is not carried out, and it has not been determined yet to which area of the optical disk medium 51 the body portion, which is the next to be written to the optical disk medium 51, will be written. Therefore, no actual seek occurs in the optical disk drive 32. Note that actual writing of the header portion to the provisional header area may naturally be carried out.

At step S23, the capture application 111 accesses the main memory 23 to determine whether body fragment data to be recorded next has been generated in the main memory 23 by the above-described capturing process. If it is determined that the body fragment data to be recorded has been generated and that further recording onto the optical disk medium 51 is required, the capture application 111 proceeds to step S24. At step S24, the capture application 111 controls the file system driver 122 to secure, in continuous free space on the optical disk medium 51, the body fragment areas of a size corresponding to the body fragment of each of the audio file 202, the audio file 203, and the video file 201 successively in this order.

After securing the body fragment areas, the capture application 111 controls the file system driver 122 to record the body fragment data in the secured body fragment areas at step S25. After the process of step S25 is completed, the capture application 111 returns to step S22, and repeats the subsequent processes until it is determined that there is no body fragment data that has been generated in the main memory 23 by the capturing process and remains to be written to the optical disk medium 51.

Then, when it is determined at step S23 that the recording of further body fragments is not required because no yet-to-be-recorded body fragments exist in the main memory 23, for example, the capture application 111 proceeds to step S26.

At step S26, the capture application 111 determines whether the capturing process has been stopped, and if it is determined that the capturing process has not been stopped, the capture application 111, estimating that the main memory 23 is only temporarily lacking in the generated body fragments and that the recording of further body fragments will be required again, returns to step S22 to record the further body fragments.

If it is determined at step S26 that the capturing process has been stopped, the capture application 111 terminates the writing of the body fragments normally, and proceeds to step S27. At step S27, the capture application 111 controls the file system driver 122 to secure, in continuous free space following the last body fragment area on the optical disk medium 51, the footer areas for the footer portion of each of the audio file 202, the audio file 203, and the video file 201 successively in this order. Then, at step S28, the capture application 111 controls the file system driver 122 to record the data of the footer portions in the footer areas.

When the recording process has reached this stage, the total recording length, which should be recorded in the header portion, can be determined. Accordingly, at step S29, the capture application 111 controls the file system driver 122 to re-secure, in continuous free space following the footer areas on the optical disk medium 51, the header area in which the header portions of the audio file 202, the audio file 203, and the video file 201 are to be recorded successively in this order. In other words, the capture application 111 controls the file system driver 122 to update the area information concerning the provisional header area that has been provisionally secured at step S21 and held in the main memory 23 to the continuous free space that follows the footer areas (i.e., modify the header area).

After re-securing of the header area, the capture application 111 controls the file system driver 122 to record the header portions in the re-secured header area at step S30. After issuance of an instruction to record the header portions, the capture application 111 terminates the recording process normally.

As described above, the capture application 111 controls the file system driver 122 to secure the provisional header area in the initial step of the recording process, then secure the body fragment areas in the optical disk medium 51 and write the body fragments thereto, then secure the footer areas and write the footer portions thereto, and then re-secure the header area in the space following the footer areas (i.e., modify the header area) and write the header portions to the new header area.

In the case where the recording process is terminated abnormally in the course of the process, processes that otherwise should be performed thereafter are not performed. When the recording process is terminated normally or abnormally (i.e., when a file close instruction is received from the OS), the file system driver 122 performs a termination process to cause the file system in the optical disk medium 51 to reflect file information concerning each of the above-described files and area information concerning each of the areas to which the files have been written.

Figure 7:
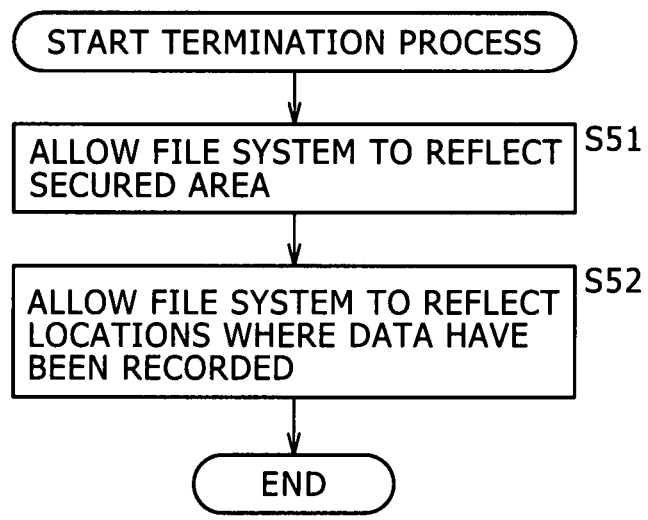
FIG. 7 is a flowchart for explaining an exemplary flow of a termination process.

An exemplary flow of the termination process will now be described below with reference to a flowchart of FIG. 7.

When the termination process is started, the file system driver 122 allows the file system (i.e., the management information) in the optical disk medium 51 to reflect the secured header area at step S51, and allows the file system to reflect, with respect to the other areas, the locations where the data have been recorded at step S52. When the process of step S52 is completed, the file system driver 122 finishes the termination process.

In the case where the recording process is terminated normally, the file system driver 122 performs the above-described termination process, so that the location of the header area where the header portions have actually been written is written to the file system. In the case where the recording process is terminated abnormally, the file system driver 122 performs the termination process in a similar manner. In the case of the abnormal termination, the provisional header area has been secured at the time of the abnormal termination; therefore, the file system driver 122 allows the file system in the optical disk medium 51 to reflect the secured provisional header area.

That is, because the capture application 111 that operates in the user mode 100 secures the provisional header area before the writing of the body portions in the recording process, it is possible to allow the file system to reflect the provisional header area, even if the abnormal termination occurs. Therefore, it is possible to allow the data that has been written to the optical disk medium 51 until the abnormal termination to be recognizable as a file without the need for performing a data recovery process as described in Japanese Patent Laid-open No. 2006-65912 mentioned above.

That is, only by restarting the capture application 111, which was abnormally terminated, the optical disk recording apparatus 11 can handle the data that has been written to the optical disk medium 51 until the abnormal termination as a file, without the need to perform a special data recovery process that does not comply with the file system of the optical disk medium 51. Therefore, subsequently, the optical disk recording apparatus 11 is able to easily carry out a process, such as resuming the interrupted writing process, deleting the file, or the like, by using the restarted capture application 111.

In addition, even in the case where the recording process has been terminated abnormally, the file system is stored properly and the data that has been written to the optical disk medium 51 until the abnormal termination is recognized as a file by the file system. Therefore, the optical disk recording apparatus 11 and any other apparatuses that support the file system of the optical disk medium 51 are able to handle the data that has been written to the optical disk medium 51 until the abnormal termination as a file. For example, suppose that the optical disk medium 51 is removed from the optical disk drive 32 and mounted on another optical disk drive (or another apparatus) after the abnormal termination of the recording process. In this case, the data that has been written to the optical disk medium 51 until the abnormal termination can be processed as a file by the other optical disk drive (or the other apparatus), even if the other optical disk drive (or the other apparatus) does not have a data recovery capability.

Further, the securing of the provisional header area is easily achievable by the capture application 111, by simply generating the information concerning the virtual header area and holding the information in the main memory 23. Even in the case where the header portions are actually written to this provisional header area, a processing load therefor is light because the amount of data in the header area is, in general, sufficiently small as compared to that of the body area.

In the case where the recording process is terminated normally, the capture application 111 re-secures the header area to which the header portions are written (i.e., updates the header area as secured). This process is achieved easily by simply updating the information in the main memory 23, with a light processing load.

Further, the above-described manner of processing by the capture application 111 allows the file system driver 122 to perform a similar termination process regardless of whether the recording process is terminated normally or abnormally.

As described above, without the need for any special structure or data recovery process, the optical disk recording apparatus 11 can accomplish the data recording easily in such a manner as to comply with the file system of the optical disk medium 51 regardless of whether the recording process is terminated normally or abnormally, while observing a recording area securing rule that the data should be recorded in the following order: the body, the footer, and the header. In addition, the data recorded in this manner can be recognized as a file in the file system, even if the writing of the data is terminated in the course of writing. Therefore, it is easy for the optical disk recording apparatus 11 to resume the writing of the data or delete the data.

As noted earlier, the location where the provisional header area is secured at step S21 of the recording process is arbitrary. Specific examples thereof will now be described below with reference to FIGS. 8A to 8D. In FIGS. 8A to 8D, a recording area 501 is a band-shaped representation of the recording area of the optical disk medium 51, in which inner tracks are to the left of outer tracks. On an inner side of the recording area 501, a file system (FS) management area 511 is provided. In the file system management area 511, the file system of the optical disk medium 51 is recorded. In general, the writing process proceeds from the inner side toward an outer side, and free space to which data, such as the video/audio signal, can be written is provided on the outer side of the file system management area 511.

Figure 8A:
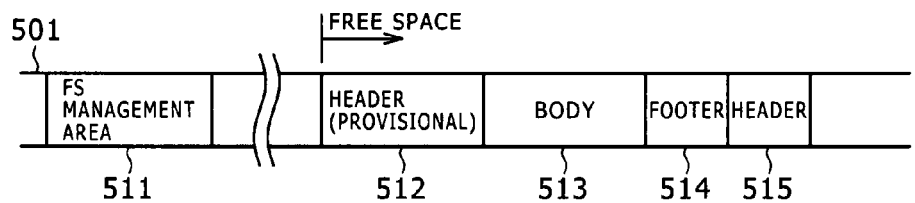
FIGS. 8A to 8D are schematic diagrams illustrating examples of provisional header areas.

FIG. 8A illustrates an exemplary case where the provisional header area is secured at the top of the free space to which the data is to be written. In FIG. 8A, a provisional header area (HEADER (PROVISIONAL)) 512 is secured at the innermost location (i.e., the top) in the free space. At locations contiguous to the provisional header area 512, a body area (BODY) 513 to which the body portions are to be written, a footer area (FOOTER) 514 to which the footer portions are to be written, and a header area (HEADER) 515 to which the header portions are to be written are secured in this order. Therefore, in this case, even if the header portions are written to the provisional header area 512 first after the start of the recording, a significant seek does not occur in the optical disk drive 32. Unfortunately, however, in this method as illustrated in FIG. 8A, regardless of whether the header portions are actually written to the provisional header area 512, the provisional header area 512 may remain significantly unavailable for use even after the header area 515 is secured.

Figure 8B:
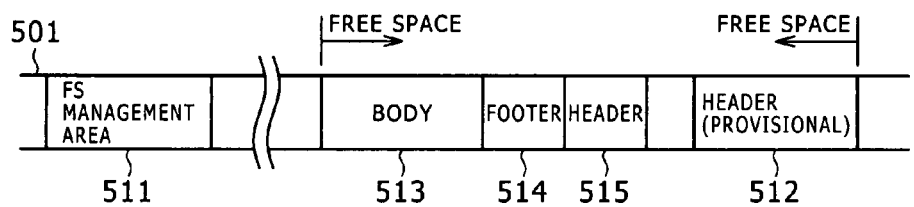

Alternatively, as illustrated in FIG. 8B, the provisional header area 512 may be secured at the outermost location in the free space (i.e., at the end of the free space), for example. When this method is adopted, the body area 513, the footer area 514, and the header area 515 can be secured so as to be arranged continuously, starting at the top of the free space and extending outward. This, for example, eliminates the need to re-secure the header area when the free space is exhausted by the body area 513 and the footer area 514, as the provisional header area 512 can be used as the header area 515. A disadvantage of this method is that, if the header portions are actually written to the provisional header area 512 when securing the provisional header area 512, a significant seek occurs in the optical disk drive 32.

Figure 8C:
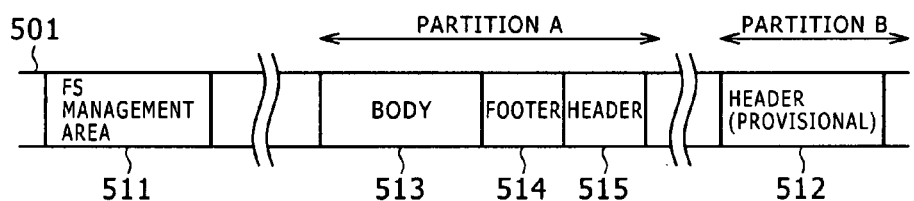

Alternatively, as illustrated in FIG. 8C, the provisional header area may be secured in a partition different from that of the rest of the AV data, for example. For example, in the case where a real-time type of file that requires reading of data from the optical disk medium 51 and reproduction of the data read therefrom to be performed in parallel (e.g., a file of video, audio, or other types of data that involves the need to maintain a reading rate at a predetermined rate or higher) and a non-real-time type of file that does not require the reading of data and the reproduction thereof to be performed in parallel (e.g., a file of text or other types of data that does not involve the need to maintain the reading rate at a predetermined rate or higher) are recorded in mutually different partitions (e.g., inner and outer partitions) in the recording area 501, it may be so arranged that the body area 513, the footer area 514, and the header area 515 are all secured in partition A (which is used for recording the real-time type of file) while only the provisional header area 512 is secured in partition B (which is used for recording the non-real-time type of file). This prevents the securing of the provisional header area 512 from reducing the space available for recording the body area 513, the footer area 514, and the header area 515. Because data of the provisional header portion is not contained in the partition used for recording the real-time type of file, it is easy to find the file when the writing thereof is abnormally terminated in the course of writing. That is, it is easy to determine whether the abnormal termination has occurred in the course of recording.

Figure 8D:
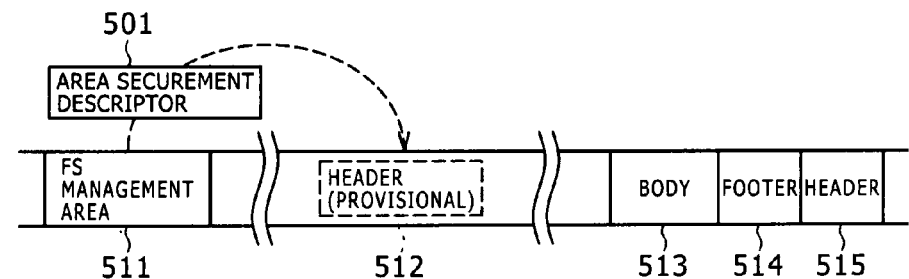

Alternatively, as illustrated in FIG. 8D, an unrecorded and unsecured area used in a sparse file or the like may be used to secure the provisional header area 512, for example. In the UDF, for example, an area securement descriptor (i.e., an allocation descriptor) 521 can be set as the unrecorded and unsecured area. Use of the area securement descriptor enables the capture application 111 to secure the provisional header area 512 without actually occupying any part of the recording area of the optical disk medium 51. Note that, when data is written to the provisional header area 512, the data may be stored in a virtual area provided in the main memory 23, for example, without actually recording the data onto the optical disk medium 51 (i.e., data writing may be performed virtually). Alternatively, as in the case of the example as illustrated in FIG. 8C, it may be so arranged that the provisional header area 512 is re-secured (temporarily saved) in the partition to which the non-real-time type of file is written, then this fact is reflected in the file system (i.e., the file system management area 511) of the optical disk medium 51, and then, after the recording of the body portion and the footer portion is completed, the header area 515 is re-secured to the rear of the footer area 514 (so as to be contiguous to and outside of the footer area 514), and then this fact is reflected in the file system (i.e., the file system management area 511) of the optical disk medium 51.

An exemplary recording model in the case where the file format of the optical disk medium 51 is the UDF will now be described below.

Figure 9:
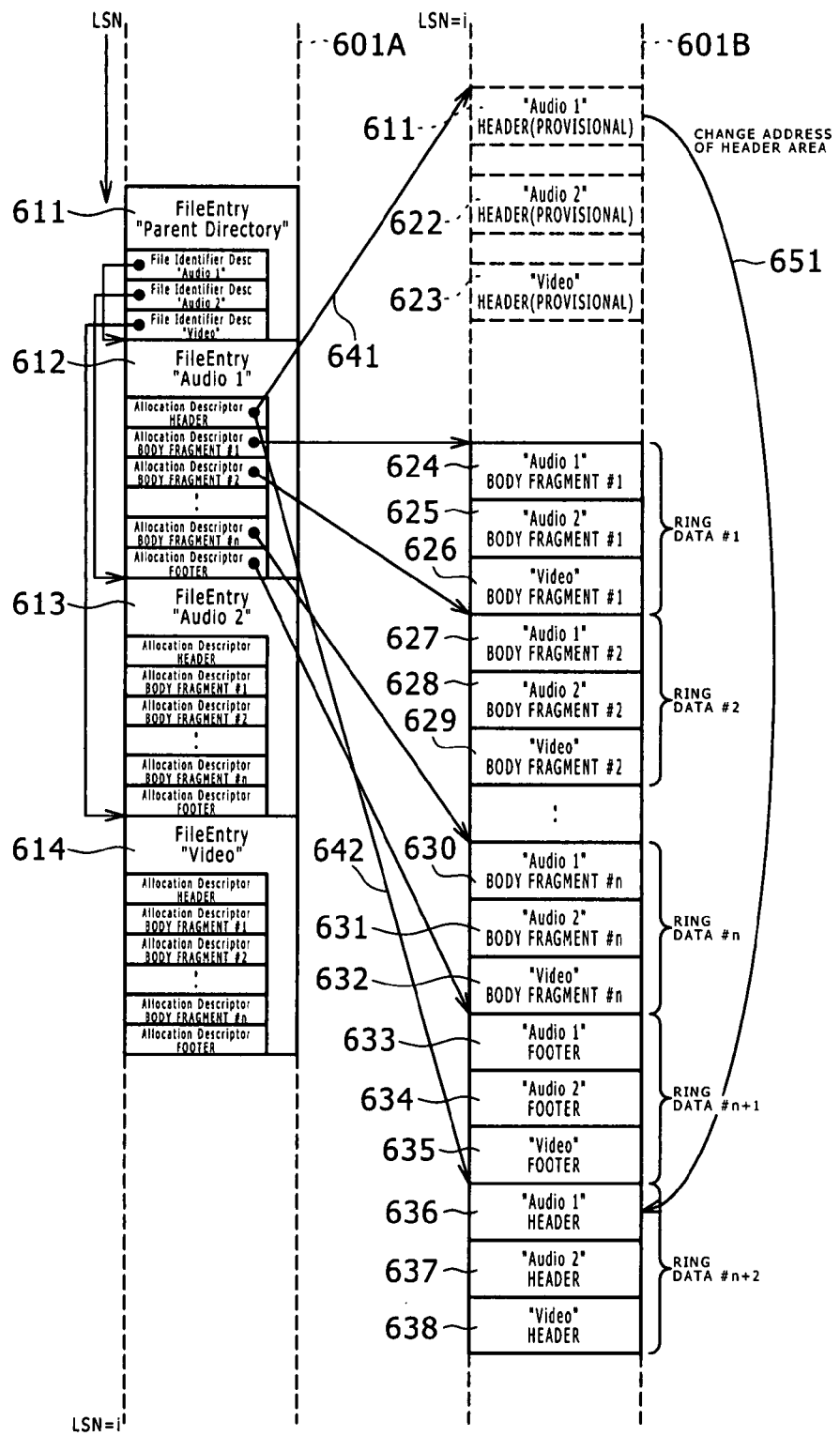
FIG. 9 is a diagram illustrating a recording model in the case where the recording process is terminated normally.

FIG. 9 illustrates a recording model in the case where the above-described recording process is terminated normally in a UDF file system. In FIG. 9, a part of the recording area of the optical disk medium 51 to which consecutive addresses (i.e., logical sector numbers (LSNs)) are allocated is represented by two vertical bands. A recording area 601A on the left-hand side of FIG. 9 is an area in which information used for managing the file system (i.e., the file system management area) is mainly recorded. A recording area 601B on the right-hand side of FIG. 9 is an area in which substance (extent) of the file is recorded.

In FIG. 9, allowing the secured header area to be reflected in the file system refers to writing the file management information to the recording area 601A, for example. To management information (Parent Directory) 611 of a parent directory of each of the audio file (Audio1), the audio file (Audio2), and the video file (Video), file identifiers (i.e., file identifier descriptors) for identifying each of the files are written (in the case of an example of FIG. 9, the file identifiers are written to space within a file entry of the management information (Parent Directory) 611 of the parent directory).

In each of the file identifiers, a file name, an address of a file entry, and the like are recorded. In addition, in an area specified by each of the file identifiers, a corresponding one of a file entry 612 of the audio file (Audio1), a file entry 613 of the audio file (Audio2), and a file entry 614 of the video file (Video) is recorded. In each of the file entries 612 to 614, a recording length of the data of the corresponding file, recording area information (i.e., allocation descriptors) of the corresponding file, etc., are recorded.

In the recording area 601B, body fragments #1 to #n, which are the substance of the files, are recorded as a ring data sequence (i.e., ring data #1 to #n). Each ring data is composed of one body fragment of the audio file (Audio1), one body fragment of the audio file (Audio2), and one body fragment of the video file (Video) put together. Then, in the footer area that follows the body area, the footer portions (i.e., footers 633 to 635) are recorded, while in the header area that follows the footer area, the header portions (i.e., headers 636 to 638) are recorded (i.e., the address of the header area as secured is changed (arrow 651)). When the recording process has been terminated normally, the file system driver 122 performs the termination process to carry out writing to update the above-described file system management information (i.e., the file entries 611 to 614) in the recording area 601A.

At this time, for example, the file system driver 122 updates the recording length, the recording area information, etc., contained in the file entry 612 so that not the provisional header area 621, which has initially been secured, but the header area 636 as secured subsequently is regarded as the header area. As a result, correspondence between the file entry 612 and the header area is indicated not by arrow 641 but by arrow 642.

Similarly, the file system driver 122 updates the recording length, the recording area information, etc., contained in the file entry 613 so that not the provisional header area 622 but the header area 637 is regarded as the header area. Also, the file system driver 122 updates the recording length, the recording area information, etc., contained in the file entry 614 so that not the provisional header area 623 but the header area 638 is regarded as the header area.

Figure 10:
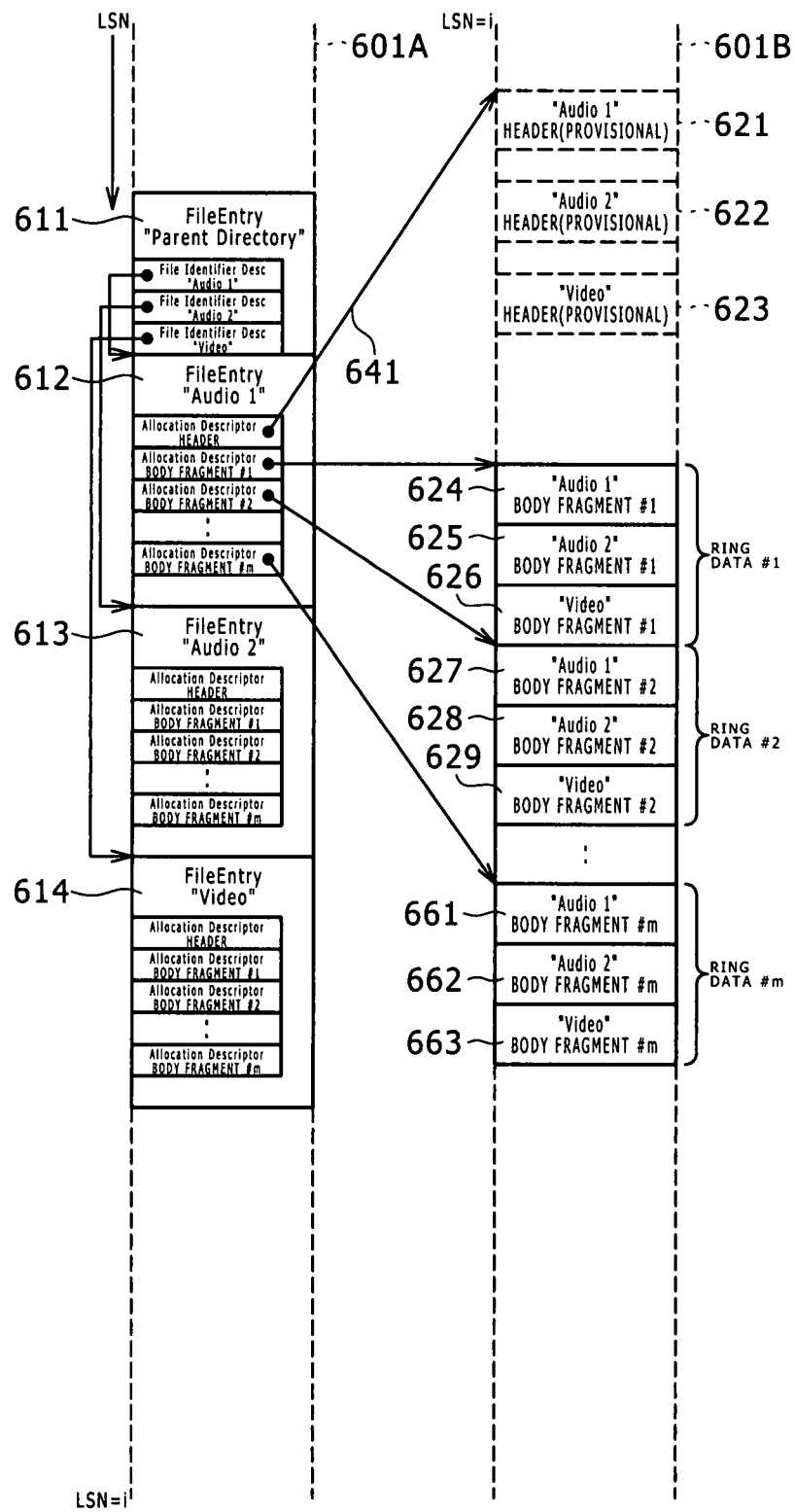
FIG. 10 is a diagram illustrating a recording model in the case where the recording process is terminated abnormally.

FIG. 10 illustrates a recording model in the case where the above-described recording process is terminated abnormally in the UDF file system. In FIG. 10, as in the case of FIG. 9, the recording length of the data of the corresponding file, the recording area information (i.e., the allocation descriptors) of the corresponding file, etc., are recorded in each of the file entries 612 to 614.

Suppose, for example, that the recording process is terminated abnormally in the course of writing the body portions. In this case, the file system driver 122 performs the termination process, as when the recording process is terminated normally, to carry out writing to update the above-described file system management information (i.e., the file entries 611 to 614) in the recording area 601A.

At this time, for example, the file system driver 122 updates the recording length, the recording area information, etc., contained in the file entry 612 so that the provisional header area 621, which has been secured at the time of the abnormal termination, is regarded as the header area. As a result, the correspondence between the file entry 612 and the header area is indicated by arrow 641.

Similarly, the file system driver 122 updates the recording length, the recording area information, etc., contained in the file entry 613 so that the provisional header area 622 is regarded as the header area. Also, the file system driver 122 updates the recording length, the recording area information, etc., contained in the file entry 614 so that the provisional header area 623 is regarded as the header area.

In this case, because no recording has been performed on the header area, the file system driver 122 returns zero (0) to a request for reading the header portion of each file. This allows the halfway recording to be reflected in the file system.

Thereafter, the capture application 111 as restarted can detect the halfway recording by once examining the recorded data of the files, and thereby resume the recording or re-secure the header of each file at this point to terminate the "recording process" normally.

Figure 11:
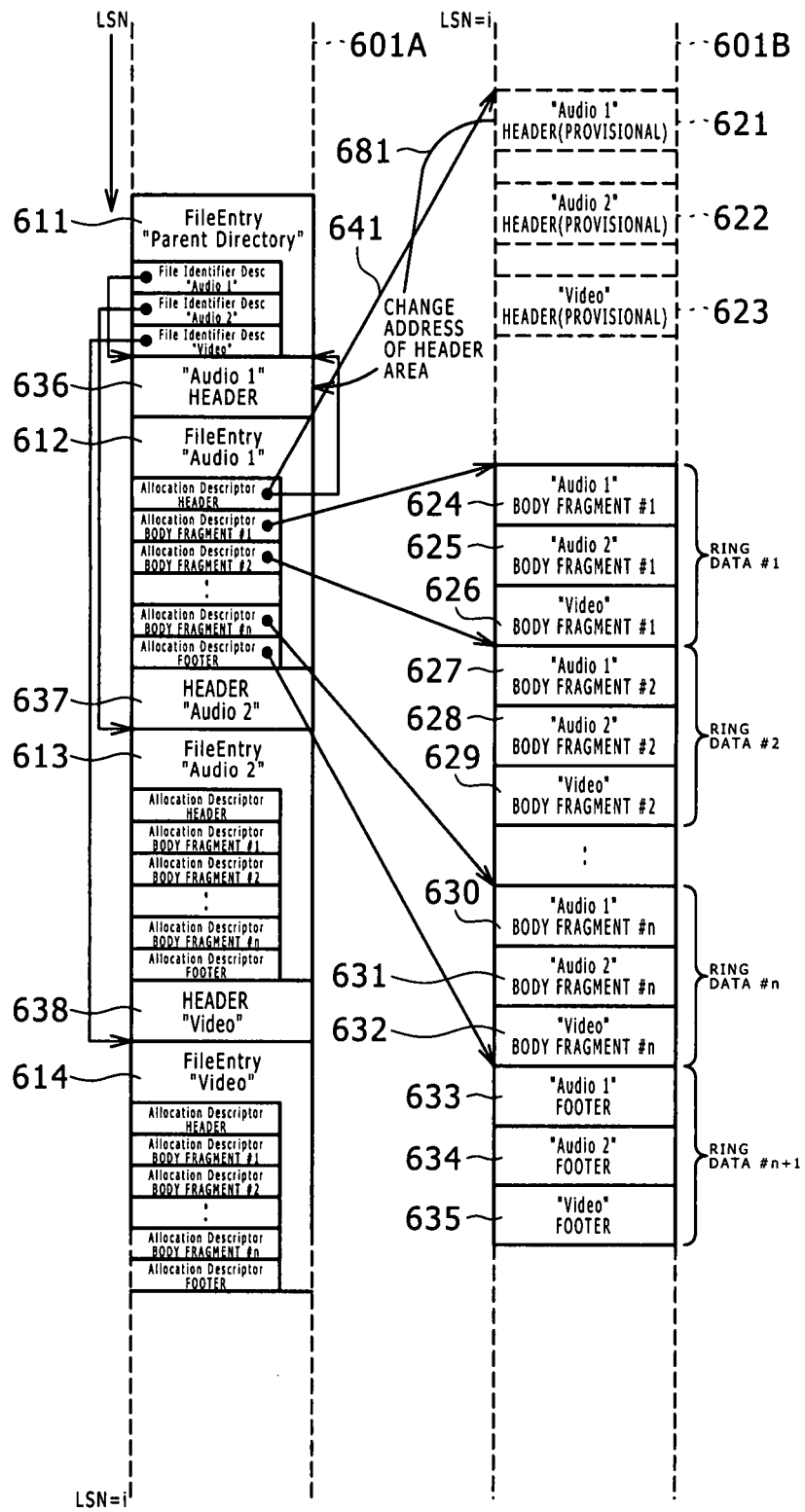
FIG. 11 is a diagram illustrating another exemplary recording model.

FIG. 11 illustrates an exemplary recording model in the UDF file system in which the technique of re-securing the header area immediately after the recording is applied. Here, immediately after the start of the recording, the header portions (i.e., the provisional header portions 621 to 623) are secured at the top of the continuous recording area, and the proper data is once recorded therein. Thereafter, as in the case of FIG. 9, the body area and the footer area are secured in continuous space, and the proper data is recorded in each of the areas. Upon completion of this recording, the header portion of each file is recorded in a header area (i.e., the header areas 636 to 638) re-secured at a location immediately preceding the corresponding file entry (i.e., the file entries 612 to 614) in the recording area 601A as illustrated in FIG. 11. Upon completion of this recording, the file system driver 122 records each file entry (note that writing of the header portions and update of the file entries may be performed successively on a file-by-file basis). A seek distance at the time of recording according to this recording model is not significantly different from that of the recording model of FIG. 9. However, in the case where, when the file is opened for reproduction thereof, the file entries are accessed first and then the reading of the header portions is performed, for example, the seek distance is reduced as compared to the recording model of FIG. 9, which may result in improved performance.

The above-described series of processes can be implemented by either hardware or software. In the case where the above-described series of processes are implemented by software, a program that forms the software is installed from a network or a storage medium.

This storage medium may be the removable medium 37 as illustrated in FIG. 1, which is distributed, separately from the optical disk recording apparatus 11, for providing the program to the user and which has the program recorded thereon, such as a magnetic disk (e.g., a flexible disk), an optical disk (e.g., a CD-ROM (Compact Disc-Read Only Memory) or a DVD (Digital Versatile Disk)), a magneto-optical disk (e.g., an MD (Mini-Disk)(a registered trademark)), or a semiconductor memory. Alternatively, the above storage medium may be the ROM 24 or the hard disk contained in the storage section 35, which is originally contained in the optical disk recording apparatus 11 and thus provided to the user and which has the program stored therein.

Note that the steps implemented by the program stored in the storage medium may naturally be performed chronologically in the order as described in the present specification but do not have to be performed chronologically. Some steps may be performed in parallel or independently.

Also note that the components incorporated in a single apparatus in the foregoing description may be divided and incorporated separately into two or more apparatuses. Conversely, components that have been described above to be contained in different apparatuses may be incorporated into a single apparatus. Also note that any other component that has not been mentioned herein may naturally be added to any apparatus described above. Further, as long as the structure and operation of the system as a whole are not changed significantly, some of the components of one apparatus may instead be contained in another apparatus. That is, it should be understood by those skilled in the art that various modifications, combinations, sub-combinations and alterations may occur depending on design requirements and other factors insofar as they are within the scope of the appended claims or the equivalents thereof.

The invention claimed is:

1. A recording apparatus for recording a file stream composed of a header, a body, and a footer onto a storage medium, the apparatus comprising:
   a processor; and a memory coupled to the processor, the memory storing instructions executable by the processor, the instructions comprising:

by holding in a main memory provisional header information for first audio data, second audio data, and video data and not recording any headers in the first header area;

recording the body and the footer in the recording area of the storage medium;

securing a second header area in the recording area after the body and the footer have been recorded in the recording area by changing the provisional header information for the first audio data, second audio data, and video data into non-provisional header information for the first audio data, second audio data, and video data, the second header area following areas in which the body and the footer have been recorded;

recording the header for the file stream in the secured second header area; and recording information about the second header area in the storage medium, wherein a recording process for the file stream, when terminated normally and when terminated abnormally, is reflected in a file system of the storage medium, wherein when the recording process for the file stream is terminated abnormally an allocation descriptor for the provisional header is recorded onto the storage medium.

2. The recording apparatus according to claim 1, wherein said first header area securing comprises setting the header area virtually to secure the header area provisionally.

3. The recording apparatus according to claim 1, wherein said first header area securing comprises setting the header area at a top of free space of the recording area.

4. The recording apparatus according to claim 1, wherein said first header area securing comprises setting the header area at an end of free space of the recording area.

5. The recording apparatus according to claim 1, wherein said first header area securing comprises setting the header area in one of a plurality of partitions provided in the recording area that is different from a partition in which the body and the footer are recorded.

6. The recording apparatus according to claim 1, wherein, the file system is UDF (Universal Disk Format), and
said first or second header area securing arranges the header area in an unrecorded and unsecured area in the UDF.

7. A method for recording a file stream composed of a header, a body, and a footer onto a storage medium, the method comprising:

by holding in a main memory provisional header information for first audio data, second audio data, and video data and not recording any headers in the first header area;

recording the body and the footer in the recording area of the storage medium;

securing a second header area in the recording area after the body and the footer have been recorded in the recording area by changing the provisional header information for the first audio data, second audio data, and video data into non-provisional header information for the first audio data, second audio data, and video data, the second header area following areas in which the body and the footer have been recorded;

recording the header for the file stream in the secured second header area; and recording information about the second header area in the storage medium, wherein a recording process for the file stream, when terminated normally and when terminated abnormally, is reflected in a file system of the storage medium, wherein when the recording process for the file stream is terminated abnormally an allocation descriptor for the provisional header is recorded onto the storage medium.

8. A non-transitory computer-readable medium including a program executable by a processor for recording a file stream composed of a header, a body, and a footer onto a storage medium, where the program causes the processor to:

by holding in a main memory provisional header information for first audio data, second audio data, and video data and not recording any headers in the first header area;

record the body and the footer in the recording area of the storage medium;

secure a second header area in the recording area after the body and the footer have been recorded in the recording area by changing the provisional header information for the first audio data, second audio data, and video data into non-provisional header information for the first audio data, second audio data, and video data, the second header area following areas in which the body and the footer have been recorded;

recording the header for the file stream in the secured second header area; and recording information about the second header area in the storage medium, wherein a recording process for the file stream, when terminated normally and when terminated abnormally, is reflected in a file system of the storage medium, wherein when the recording process for the file stream is terminated abnormally an allocation descriptor for the provisional header is recorded onto the storage medium.

* * * * *